United States Patent
Nehls et al.

(10) Patent No.: US 10,498,119 B2
(45) Date of Patent: Dec. 3, 2019

(54) STRUCTURES FOR SECURING BROADCAST CABLING AND CONNECTORS

(71) Applicant: Optical Cable Corporation, Roanoke, VA (US)

(72) Inventors: Charlie Nehls, Fenton, MO (US); Ian J. Timmins, Asheville, NC (US); Nicholas Uhland, Asheville, NC (US)

(73) Assignee: Optical Cable Corporation, Roanoke, VA (US)

( * ) Notice: Subject to any disclaimer, the term of this patent is extended or adjusted under 35 U.S.C. 154(b) by 0 days.

(21) Appl. No.: 15/700,944

(22) Filed: Sep. 11, 2017

(65) Prior Publication Data

US 2018/0076604 A1    Mar. 15, 2018

Related U.S. Application Data

(60) Provisional application No. 62/385,490, filed on Sep. 9, 2016.

(51) Int. Cl.
| | |
|---|---|
| *H02G 3/04* | (2006.01) |
| *G02B 6/44* | (2006.01) |
| *A47B 97/00* | (2006.01) |

(52) U.S. Cl.
CPC ......... *H02G 3/0456* (2013.01); *G02B 6/4452* (2013.01); *G02B 6/4471* (2013.01); *A47B 2097/003* (2013.01)

(58) Field of Classification Search
CPC ...... H02G 3/0456; H02G 3/22; G02B 6/4471; F16L 5/00; F16L 3/223; A47F 2007/0085; A47F 7/005; A47B 2097/003; B65D 85/42

USPC ....... 211/26.2, 2; 248/49, 56, 65; 312/223.1, 312/223.6, 213
See application file for complete search history.

(56) References Cited

U.S. PATENT DOCUMENTS

| | | | | |
|---|---|---|---|---|
| 4,343,172 | A * | 8/1982 | Nordlund | B25H 3/04 72/339 |
| 4,586,633 | A * | 5/1986 | Holland | G07F 11/34 211/49.1 |
| 4,892,198 | A * | 1/1990 | Johnson | A47F 5/005 211/184 |
| 5,267,710 | A * | 12/1993 | Condon | F16L 3/24 248/56 |
| 5,422,436 | A * | 6/1995 | Zachrai | H02B 1/305 174/152 G |
| 5,615,850 | A * | 4/1997 | Cloninger | F16L 3/22 211/26 |

(Continued)

*Primary Examiner* — Jennifer E. Novosad
(74) *Attorney, Agent, or Firm* — William G. Heedy; The Van Winkle Law Firm

(57) ABSTRACT

A structure for securing broadcast cables and connectors includes a rack mounted enclosure frame having an inner facing surface surrounding a cavity, wherein a rear side of the rack mounted enclosure defines a plurality of isolation plate mounts and a front side of the rack mounted enclosure defines an open-ended side; a rack mounted panel defining a plurality of isolation plate mounts, the rack mounted panel being sized and configured for engaged abutment with the open-ended front side of the rack mounted enclosure, and wherein each of the plurality of isolation plate mounts are angled relative to the front side of the rack mounted enclosure frame; and the rack mounted panel including a top section and a bottom section, and wherein the top and bottom sections join together at a convex angle.

3 Claims, 4 Drawing Sheets

(56) References Cited

U.S. PATENT DOCUMENTS

| | | | | |
|---|---|---|---|---|
| 5,641,079 A * | 6/1997 | Schmidt | A47F 5/0823 | 211/104 |
| 5,945,633 A * | 8/1999 | Ott | G02B 6/4452 | 174/59 |
| 5,971,329 A * | 10/1999 | Hickey | F16L 3/227 | 248/316.7 |
| 6,269,961 B1 * | 8/2001 | Porcelli | A47F 5/112 | 211/70.7 |
| 6,305,388 B1 * | 10/2001 | Zeller | A45D 44/02 | 132/287 |
| 6,591,952 B1 * | 7/2003 | Randall | A45D 44/02 | 191/12.4 |
| 6,866,541 B2 * | 3/2005 | Barker | G02B 6/4452 | 439/540.1 |
| 6,884,942 B2 * | 4/2005 | McGrath | H04Q 1/064 | 174/135 |
| 6,959,821 B2 * | 11/2005 | Huang | G09F 9/35 | 211/13.1 |
| 7,098,406 B1 * | 8/2006 | Hammonds | B65H 75/06 | 174/135 |
| 7,249,681 B2 * | 7/2007 | Scicluna | G11B 33/0472 | 206/307 |
| 7,520,474 B1 * | 4/2009 | Condon | F16L 3/223 | 248/300 |
| 7,637,773 B2 * | 12/2009 | Shifris | H01R 9/2416 | 439/540.1 |
| 7,866,909 B2 * | 1/2011 | Denmark | F16B 21/09 | 24/115 G |
| 7,905,454 B2 * | 3/2011 | Sanatgar | F28F 9/013 | 248/300 |
| 8,038,015 B2 * | 10/2011 | Laursen | H04Q 1/09 | 211/26 |
| 8,054,649 B2 * | 11/2011 | Peng | H05K 7/1487 | 248/298.1 |
| 8,119,915 B2 * | 2/2012 | Regester | H04Q 1/06 | 174/100 |
| 8,246,382 B1 * | 8/2012 | Ku | H05K 7/186 | 439/540.1 |
| 8,360,373 B2 * | 1/2013 | Johnson | A47F 7/024 | 211/26 |
| 8,522,969 B2 * | 9/2013 | Mason | B25H 3/02 | 206/234 |
| 8,544,623 B1 * | 10/2013 | Murphy | H02G 11/02 | 191/12.4 |
| 8,695,929 B2 * | 4/2014 | Cox | H02G 3/0493 | 174/100 |
| 8,834,199 B2 * | 9/2014 | Foung | H01R 13/518 | 439/540.1 |
| 8,931,742 B2 * | 1/2015 | Gong | H05K 7/1491 | 248/49 |
| 9,247,319 B2 * | 1/2016 | Cole | H04Q 1/13 | |
| 9,383,179 B1 * | 7/2016 | Spilotro | F42B 39/28 | |
| 9,532,638 B2 * | 1/2017 | Davis | A45D 44/02 | |
| 9,632,271 B2 * | 4/2017 | Montgelas | G02B 6/4452 | |
| 9,660,397 B2 * | 5/2017 | Islam | H01R 13/74 | |
| 9,846,291 B2 * | 12/2017 | Montgelas | G02B 6/4452 | |
| 9,914,209 B2 * | 3/2018 | Grela | B25H 3/028 | |
| 9,924,611 B2 * | 3/2018 | Tonthat | H05K 7/1489 | |
| 9,938,012 B1 * | 4/2018 | Kollias | B64D 11/00 | |
| 2002/0181896 A1 * | 12/2002 | McClellan | G02B 6/4452 | 385/88 |
| 2006/0032990 A1 * | 2/2006 | Cask | H02G 3/045 | 248/56 |
| 2006/0118321 A1 * | 6/2006 | Herring | H02G 3/0431 | 174/101 |
| 2007/0196071 A1 * | 8/2007 | Laursen | G02B 6/3897 | 385/135 |
| 2009/0067800 A1 * | 3/2009 | Vazquez | G02B 6/4455 | 385/135 |
| 2009/0163043 A1 * | 6/2009 | Demers | G02B 6/4452 | 439/43 |
| 2009/0321371 A1 * | 12/2009 | Rathbone | H05K 7/1491 | 211/26.2 |
| 2012/0193309 A1 * | 8/2012 | Fleischer | H05K 5/0204 | 211/26.2 |
| 2012/0288249 A1 * | 11/2012 | Ruiz | H04Q 1/02 | 385/135 |
| 2013/0134116 A1 * | 5/2013 | Taylor | H04Q 1/06 | 211/26.2 |
| 2014/0206273 A1 * | 7/2014 | Larsen | H05K 7/20709 | 454/184 |
| 2014/0366390 A1 * | 12/2014 | Lampley | B65H 75/34 | 30/537 |
| 2017/0187205 A1 * | 6/2017 | Li | H02J 7/0027 | |
| 2018/0076604 A1 * | 3/2018 | Nehls | H02G 3/0456 | |

* cited by examiner

STRUCTURES FOR SECURING BROADCAST CABLING AND CONNECTORS

RELATED APPLICATION

This application claims priority to and incorporates entirely by reference U.S. Provisional Application No. 62/385,490, filed on Sep. 9, 2016.

FIELD OF THE INVENTION

This invention relates to broadcast connectivity and, more particularly, a system of structures for securing broadcast cabling and connectors.

BACKGROUND OF THE INVENTION

The broadcast market utilizes unique cables and connectors. The specific types of cable and connectors chosen for a particular network is related to the network's topology, protocol, and size. This invention details the development of multiple panels, enclosures, and brackets that cater to the broadcast market.

SUMMARY OF THE INVENTION

In accordance with one form of this invention there is provided a structure for securing broadcast cables and connectors, the structure including a rack mounted enclosure frame having an inner facing surface surrounding a cavity, wherein a rear side of the rack mounted enclosure defines a plurality of isolation plate mounts and a front side of the rack mounted enclosure defines an open-ended side; a rack mounted panel defining a plurality of isolation plate mounts, the rack mounted panel being sized and configured for engaged abutment with the open-ended front side of the rack mounted enclosure, and wherein each of the plurality of isolation plate mounts are angled relative to the front side of the rack mounted enclosure frame; and the rack mounted panel including a top section and a bottom section, and wherein the top and bottom sections join together at a convex angle.

In accordance with another form of this invention, there is provided a structure for securing broadcast cables and connectors, the structure including a rack mounted enclosure frame having an inner facing surface surrounding a cavity, wherein a rear side of the rack mounted enclosure defines a plurality of isolation plate mounts and a front side of the rack mounted enclosure defines an open-ended side; a rack mounted panel defining a plurality of isolation plate mounts, the rack mounted panel being sized and configured for engaged abutment with the open-ended front side of the rack mounted enclosure, and wherein each of the plurality of isolation plate mounts are angled relative to the front side of the rack mounted enclosure frame; and the rack mounted panel including a top section and a bottom section, and wherein the top and bottom sections join together at a concave angle.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Figure 4:
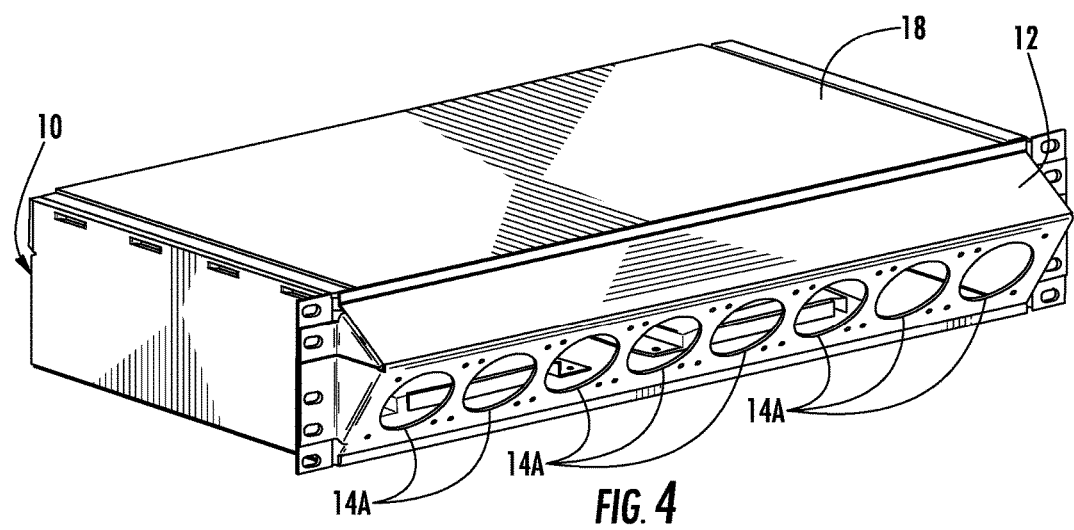
FIG. 4 is a perspective view of a rack mount enclosure with angle panel in front, wherein the enclosure attaches directly to the rack and the panel is attached to the rack on top of the enclosure.
Figure 5:
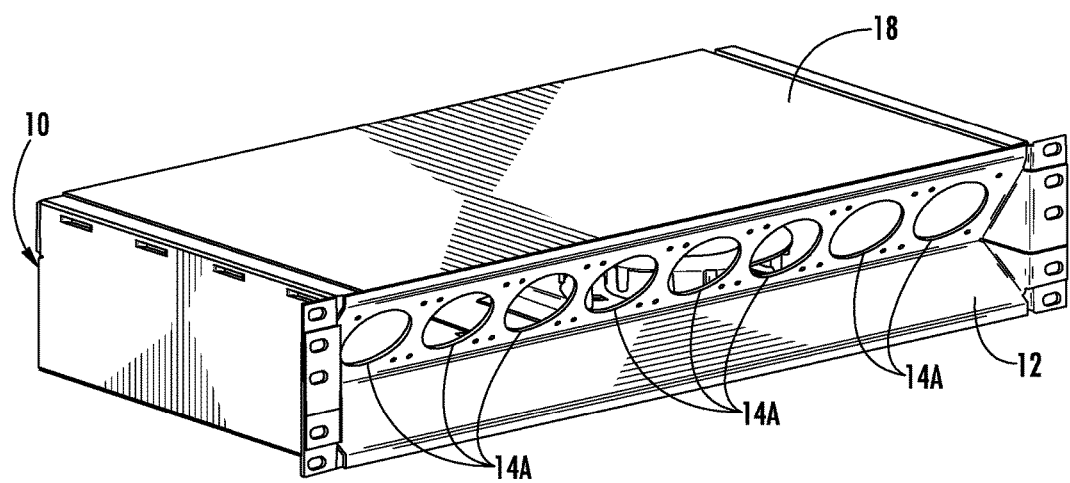
FIG. 5 is a perspective view of a closed rack mount enclosure with angle panel in alternate orientation.

Referring to the several views of the drawings, the system of structures for securing broadcast cabling and connectors of the present invention is shown and described herein and is generally indicated as 10, a fully assembled rack mount enclosure 16 with attachment of a rack mounted panel 12 in alternate orientation, as shown in FIG. 4-5.

Figure 1:
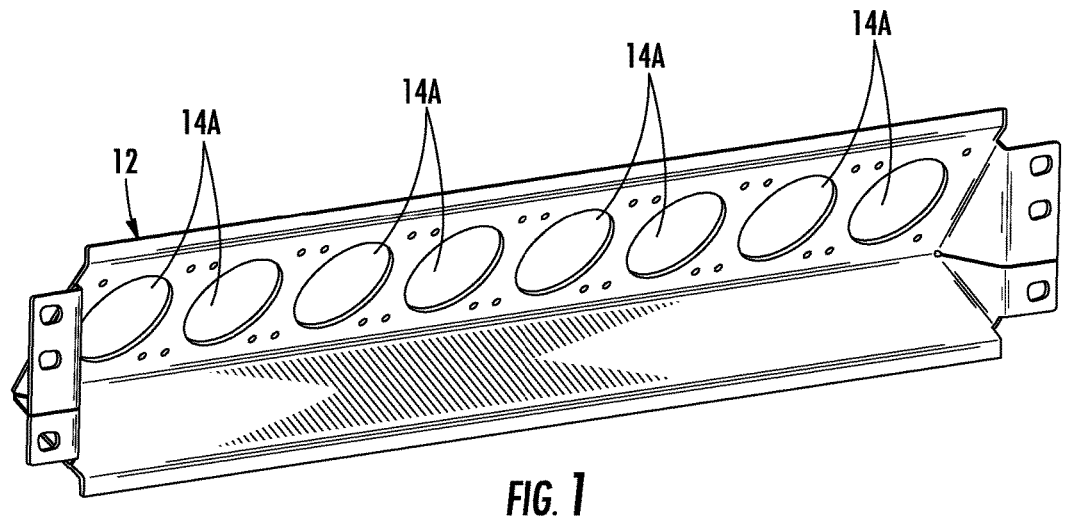
FIG. 1 is a perspective view of a rack mounted panel with eight isolation plate mounts and being made from one metal piece with no welds or other fastening mechanisms.
Figure 2:
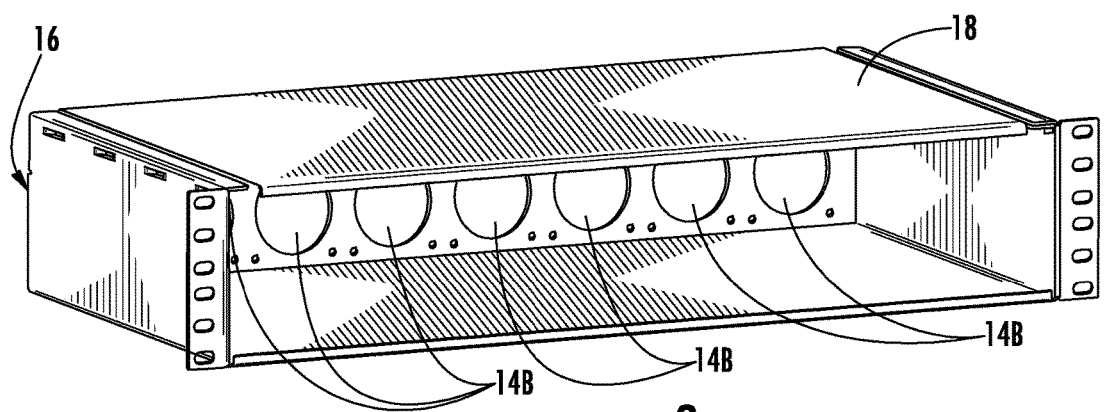
FIG. 2 is a perspective view of a 2u rack mounted enclosure with removable cover and eight universal isolation plate mounts on the rear and an open front that can accommodate an angled adapter plate.
Figure 3:
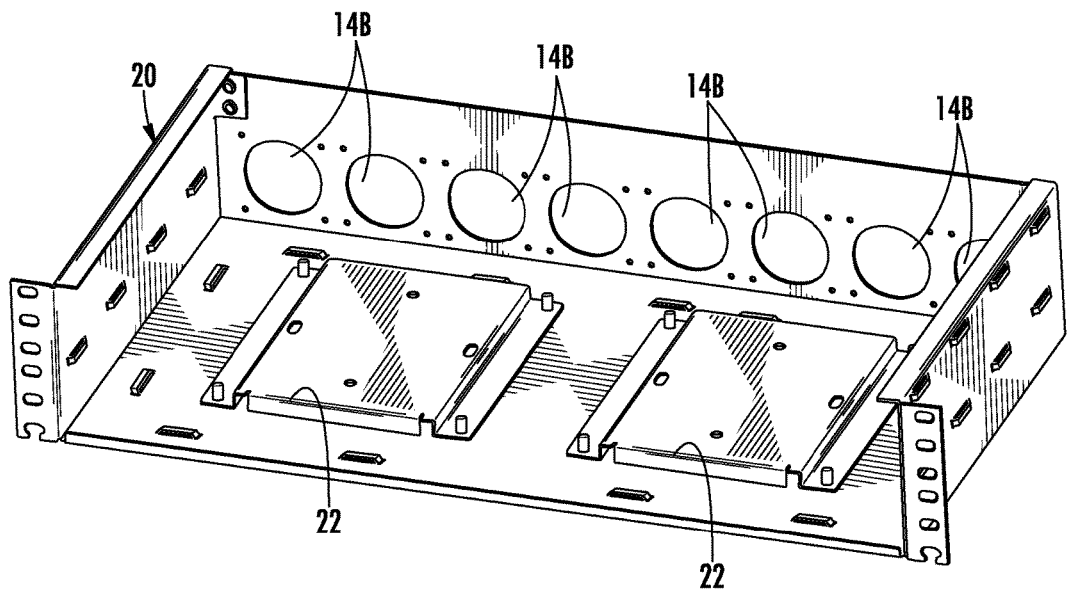
FIG. 3 is a perspective view of an open rack mount enclosure with cable management brackets.

Referring to FIGS. 1-3 and initially to FIG. 1, a rack mounted panel 12 has two wings forming a convex angle and includes eight universal isolation plate mounts 14A on one wing. In a preferred, non-limiting embodiment, the rack mounted panel 12 is made from one metal piece with no welds or other fastening mechanisms. Other suitable materials may be used to form the rack mounted panel 12. Referring now to FIG. 2, the 2u rack mounted enclosure 16 includes a removable cover 18 and eight universal isolation plate mounts 14B on the rear, as well as an open front that can accommodate the rack mounted panel 12. Referring specifically to FIG. 3, an opened 2u rack mount enclosure base 20 is shown without the removable cover 18 or the attachable rack mount panel 12. On the inner bottom surface, there is at least one cable management brackets 22 for managing cable.

Referring specifically to FIG. 4, a fully assembled 2u rack mount enclosure 10 including the rack mounted panel 12 is shown, wherein the rack mounted panel 12 is attached to the front side of the 2u rack mount enclosure 16. The rack mounted panel 12 is attached in an orientation that the convex angle of two wings of the rack mounted panel 12 is facing inside.

Referring specifically to FIG. 5, a fully assembled 2u rack mount enclosure 10 may include the rack mounted panel 12 in an alternate, orientation that the convex angle of two wings of the rack mounted panel 12 is facing outside. Importantly, orientations of the rack mounted panel 12 can be changed without removing the 2u rack mount enclosure 16.

Figure 6:
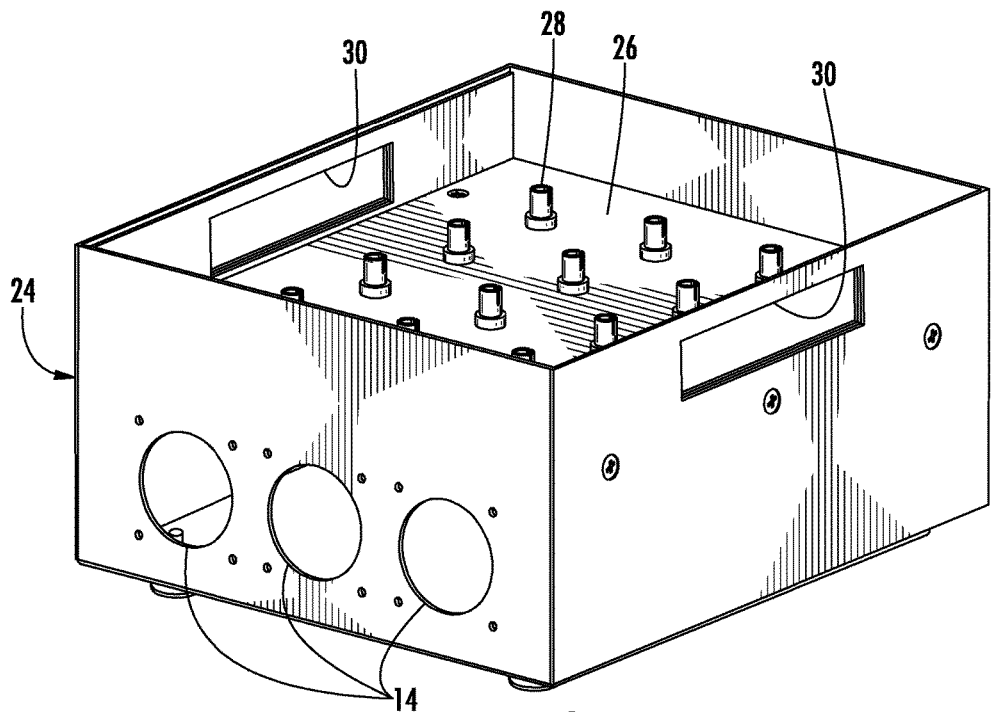
FIG. 6 is a perspective view of a rugged throw-down box with universal isolation plate mounts and including a recessed lid to protect fiber connectors and handle cutouts cut through both cover and base of enclosure.
Figure 7:
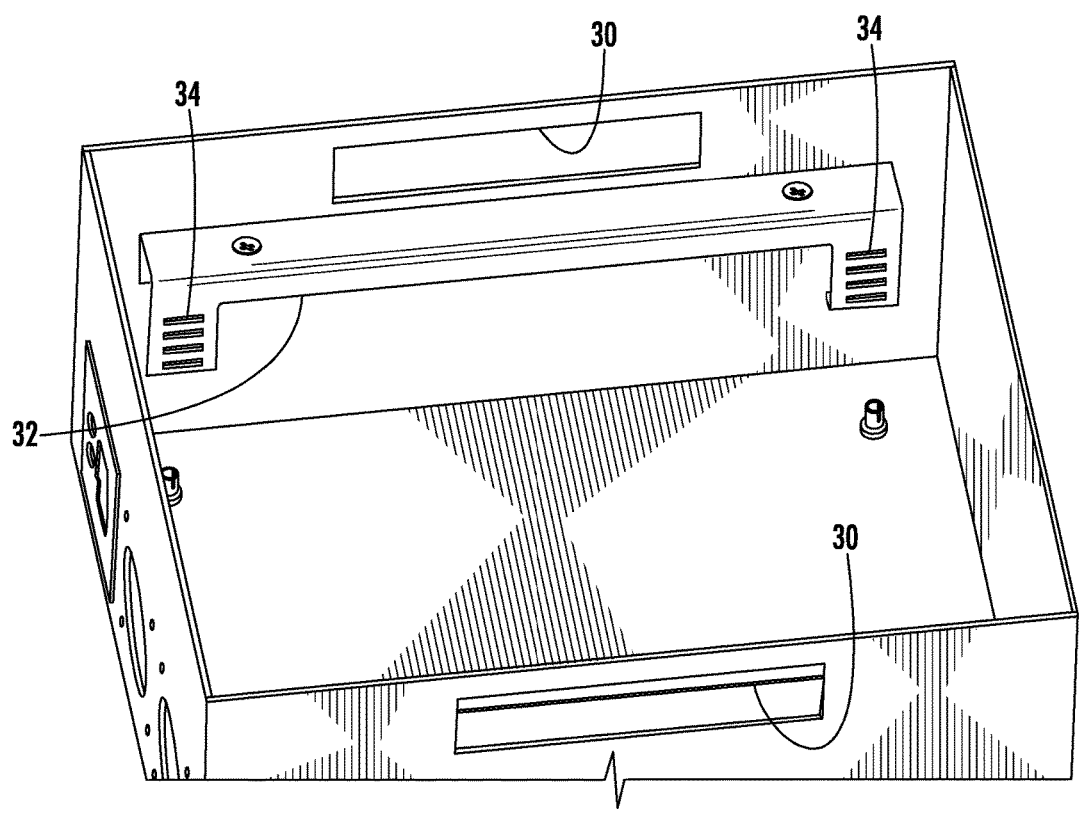
FIG. 7 is a perspective view of an interior bracket that is welded onto side of chassis. It is the base on to which the cover fastens. It incorporates a novel fiber management system on the edges of the bracket.

Referring specifically to FIG. 6, a rugged throw-down box 24 includes a number of universal isolation plate mounts 14 and a recessed lid 26 for protecting fiber connectors 28. Two handle cutouts 30 are cut through two side surfaces of the rugged throw-down box 24. Referring specifically to FIG. 7, an interior bracket 32 is welded onto the inner side surface of the rugged throw-down box 24, below the handle cutout 30. It is the base on to which a cover fastens, thereby forming the recessed lid 26. Moreover, the interior bracket 32 includes a slotted fiber management system 34 along its opposing edges.

It is preferred that the angle between two wings of the rack mounted panel 12 is between 30° and 90°. As shown FIG. 4-5, the universal isolation plate mounts 14A may be on the top section (as shown in FIG. 5) or the bottom section (as shown in FIG. 4) of the front side of the 2u rack mounted enclosure 16, as is required by the environment.

While the present invention has been shown and described in accordance with several preferred and practical embodiments, it is recognized that departures from the instant disclosure are contemplated within the spirit and scope of the present invention.

What is claimed is:

1. A structure for securing broadcast cables and connectors, said structure comprising:
   a rack mounted enclosure including a removable top cover, a bottom surface, two side surfaces and a rear surface surrounding a cavity, wherein the rear surface of said rack mounted enclosure defines a first plurality of isolation plate mounts and a front side of said rack mounted enclosure defines an open-ended front side and a top surface of said rack mounted enclosure comprises the removable top cover;
   a rack mounted panel having a first wing and a second wing, said rack mounted panel defining a second plurality of isolation plate mounts on the first wing, said rack mounted panel being sized and configured for engaged abutment with the open-ended front side of said rack mounted enclosure, and wherein the first and the second wings join together to form a convex angle;
   said rack mounted panel being selectively interchangeable between first and second configurations, wherein the first configuration is defined by said rack mounted panel being selectively attached to the open-ended front side of said rack mounted enclosure with the convex angle formed by the first and the second wings facing inside of the cavity and the second configuration is defined by said rack mounted panel being selectively attached to the open-ended front side of said rack mounted enclosure with the convex angle formed by the first and the second wings facing outside away from the cavity; and
   at least one cable management bracket on an inner side of the bottom surface of said rack mounted enclosure.

2. The structure for securing broadcast cables and connectors as recited in claim 1 wherein the first and the second wings of said rack mounted panel form a convex angle between 30° and 90°.

3. The structure for securing broadcast cables and connectors as recited in claim 1 wherein the rack mounted panel is formed from a single piece of material.

* * * * *